(12) United States Patent
Habbaba et al.

(10) Patent No.: US 11,900,309 B2
(45) Date of Patent: Feb. 13, 2024

(54) ITEM DELIVERY TO AN UNATTENDED VEHICLE

(71) Applicant: Ford Global Technologies, LLC, Dearborn, MI (US)

(72) Inventors: Aysha Habbaba, Dearborn, MI (US); John Weizhong Luo, Dearborn, MI (US); Lynn Valerie Keiser, Dearborn, MI (US); Hyung Min Baek, Dearborn, MI (US); Sudipto Aich, Dearborn, MI (US); Simon Murtha Smith, Dearborn, MI (US); Alexander Silvio Muller, Dearborn, MI (US); Jennifer L. Brace, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 1150 days.

(21) Appl. No.: 16/461,039

(22) PCT Filed: Nov. 21, 2016

(86) PCT No.: PCT/US2016/063158
§ 371 (c)(1),
(2) Date: May 15, 2019

(87) PCT Pub. No.: WO2018/093396
PCT Pub. Date: May 24, 2018

(65) Prior Publication Data
US 2019/0311327 A1    Oct. 10, 2019

(51) Int. Cl.
*G06Q 10/0835*  (2023.01)
*H04W 4/44*  (2018.01)
(Continued)

(52) U.S. Cl.
CPC ..... *G06Q 10/08355* (2013.01); *G06Q 10/083* (2013.01); *H04W 4/44* (2018.02); *H04W 12/06* (2013.01)

(58) Field of Classification Search
CPC . G06Q 10/08355; G06Q 10/083; H04W 4/44; H04W 12/06; G05D 1/0044; G05D 1/0038
(Continued)

(56) References Cited

U.S. PATENT DOCUMENTS 10,373,377 B1 * 8/2019 Niewiadomski ... G01C 21/3697
10,495,476 B1 * 12/2019 Yu ..................... G01C 21/3647
(Continued)

FOREIGN PATENT DOCUMENTS

CA         3035241 A1 *  8/2019  ......... G01C 21/3438
CN       101014950 A      8/2007
(Continued)

OTHER PUBLICATIONS

Abdi, L., Meddeb, A. Driver information system: a combination of augmented reality, deep learning and vehicular Ad-hoc networks. Multimed Tools Appl 77, 14673-14703. https://doi.org/10.1007/s11042-017-5054-6 (Year: 2018).*
(Continued)

*Primary Examiner* — Shannon S Campbell
*Assistant Examiner* — Lisa Ma
(74) *Attorney, Agent, or Firm* — Brandon Hicks; Eversheds Sutherland (US) LLP

(57) ABSTRACT

A system for delivering items or packages to an unattended vehicle after receiving an order for delivery of an item or package to a vehicle is disclosed. The system determines identifying information for the vehicle, where the identifying information includes a wireless identifier of the vehicle. The system determines a delivery location of the vehicle.

(Continued)

The system transmits a request to dispatch a delivery vehicle to deliver a package to the vehicle, wherein the request comprises the identifying information and the delivery location.

4 Claims, 5 Drawing Sheets

(51) Int. Cl.
*H04W 12/06* (2021.01)
*G06Q 10/083* (2023.01)

(58) Field of Classification Search
USPC .......................................................... 705/338
See application file for complete search history.

(56) References Cited

U.S. PATENT DOCUMENTS

| | | | |
|---|---|---|---|
| 11,378,413 B1* | 7/2022 | Rao | G01C 21/3605 |
| 2007/0257774 A1* | 11/2007 | Stumpert | G06Q 10/08 |
| | | | 340/7.1 |
| 2015/0057926 A1* | 2/2015 | Gupta | G01C 21/14 |
| | | | 701/500 |
| 2015/0116358 A1* | 4/2015 | Choi | G06T 19/006 |
| | | | 345/633 |
| 2015/0127250 A1* | 5/2015 | Kim | G01C 21/20 |
| | | | 701/468 |
| 2015/0242811 A1* | 8/2015 | Gillen | G06Q 10/0838 |
| | | | 705/338 |
| 2015/0302495 A1* | 10/2015 | Stuckman | G01S 1/7034 |
| | | | 705/26.35 |
| 2016/0209647 A1* | 7/2016 | Fürsich | G02B 27/0075 |
| 2017/0018181 A1* | 1/2017 | Davidsson | G06Q 50/28 |
| 2017/0200120 A1* | 7/2017 | High | G06T 11/60 |
| 2017/0343375 A1* | 11/2017 | Kamhi | H04W 4/40 |
| 2023/0095218 A1* | 3/2023 | Livne | G06N 20/10 |
| | | | 382/118 |

FOREIGN PATENT DOCUMENTS

| | | |
|---|---|---|
| CN | 104885110 A | 9/2015 |
| CN | 106030629 A | 10/2016 |

OTHER PUBLICATIONS

Chinese Patent Application No. 2016800908841 Office Action dated Nov. 22, 2022.

* cited by examiner

ITEM DELIVERY TO AN UNATTENDED VEHICLE

TECHNICAL FIELD

The present disclosure relates to item or package delivery and more particularly relates to item or package delivery to an unattended vehicle.

BACKGROUND

Automobiles provide a significant portion of transportation for commercial, government, and private entities. Because of their high value, automobiles are often reasonably secure from intrusion or theft. Thus, owners often feel secure in leaving at least some valuable items in a vehicle.

BRIEF DESCRIPTION OF THE DRAWINGS

Non-limiting and non-exhaustive implementations of the present disclosure are described with reference to the following figures, wherein like reference numerals refer to like parts throughout the various views unless otherwise specified. Advantages of the present disclosure will become better understood with regard to the following description and accompanying drawings where.

DETAILED DESCRIPTION

Figure 1:
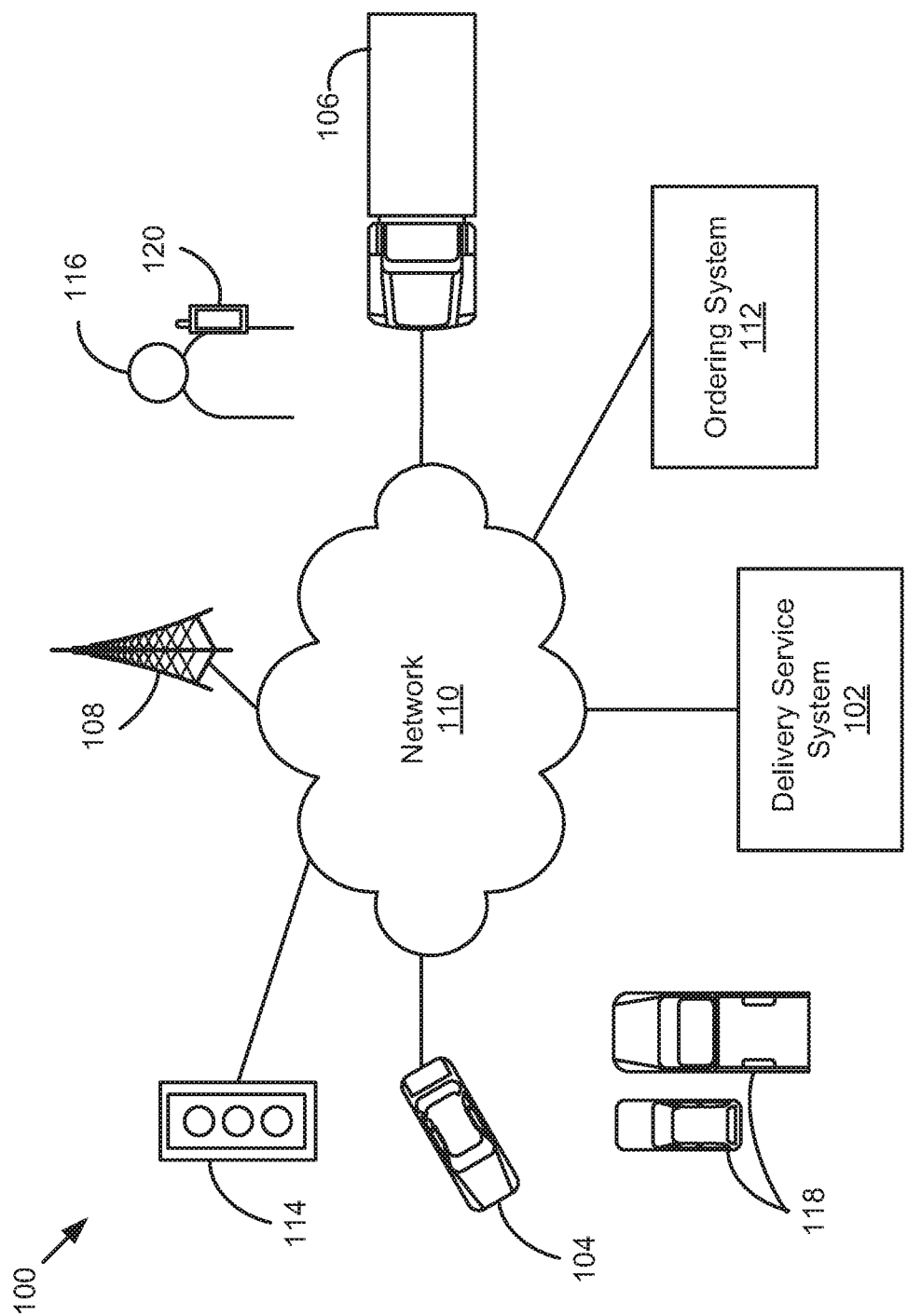
FIG. 1 is a schematic block diagram illustrating a system for delivering an item to an unattended vehicle, according to one embodiment.

Applicants have recognized that delivery of an item or package to vehicles, whether attended or unattended, may provide for convenience to owners. However, delivery of an item or package to a locked and unattended vehicle that may move from one location to another location presents some challenges. Currently, it is not possible to safely deliver an item or package to a vehicle without a user being present. It is also difficult to find the vehicle, unless it is left stationary at a location. Applicants have recognized the utility of and developed an approach to delivering an item to a vehicle without a set or predetermined location, where the delivery service is able to dynamically find the vehicle and delivers the package when the vehicle is found.

In one embodiment, a vehicle may be outfitted with certain hardware and software that can be utilized by a delivery service to find a vehicle to deliver an item (e.g., such as by a delivery service such as a FedEx®, Amazon®, a pharmacy delivering medical items, or a grocer delivering groceries). The vehicle may include global positioning system (GPS) receiver, or other positioning system receiver, to report the vehicle's location to delivery service via the vehicle's communication system, internet modems, etc. The vehicle may include an altimeter to determine if the vehicle is on one of multiple levels of a parking garage. The vehicle may use data related to wheel rotation (wheel rotation sensors) for determining whether the vehicle has entered a parking garage and climbed up one or more levels. The vehicle may use local proximity sensors to determine the location of the vehicle with relation to radio frequency identifier (RFID) transceivers, infrastructure transceivers (e.g., those located at intersections or traffic signals), or the like. In one embodiment, a delivery vehicle may receive information about the vehicle's location to drive to that location and identify the vehicle using a digital license plate reader (camera and OCR software).

In one embodiment, an RFID communicator in the vehicle is configured to send and receive RFID signals so that a vehicle can be identified. Also, the reader can read an RFID tag located proximate to the vehicle to receive location information and transmit the information to remote locations, such as a remote server or a delivery vehicle. For example, an RFID tag located in a parking spot could contain information related to the parking location in a lot, a parking structure, or other location to identify the location of the vehicle. When the vehicle parks over the RFID tag, the RFID tag and the vehicle could pair together. The vehicle can read the tag and transmit the information to a delivery service indicating where the vehicle is located. The vehicle could be parked on any level of a parking garage, in a private or public parking lot, or other location where the vehicle can be accessed for delivery.

The RFID system could also work in reverse, where an RFID tag may be located on the vehicle, and the reader may be located at the parking location and the devices pair together when the vehicle parks in the parking location. When a vehicle enters a parking structure, for example, readers may be located at one or more locations to determine the vehicle presence. They could be located at each parking spot, which may be more expensive. They could also be located at select locations so that presence information can be gathered for use by a delivery service or other entity trying to find the vehicle.

Simply enabling the finding of a vehicle is extremely valuable. The system could also be used by the vehicle owner to find a lost vehicle. If a vehicle is lost or stolen, the system could help the user find their vehicle. Often, drivers forget where they left their vehicle after spending time at a mall, concert venue, other venue or restaurant, traveled from an airport, or other location. A user may use the system to find their vehicle using a mobile app or other device to find their vehicle.

Identification of a vehicle may be based on an internet protocol (IP) address of the vehicle for wireless and modem communications, tire pressure identifiers (ID) broadcast from each wheel, a cellular phone number of vehicle, a photo ID of vehicle, and/or a photo ID of license plate. A vehicle receiving a delivery may flash its lights, honk its horn, have one turn signal light up or blink, send a text message to a driver, and/or send a ping (GPS location) to a driver with elevation information, parking location, or the like.

A receiving vehicle (i.e., target vehicle) may also identify/authorize a delivery vehicle. For example, outside cameras, rear-facing cameras can identify the delivery vehicle to give them access. A bar code or quick response (QR) code could be displayed by the delivery vehicle or presented by a driver for identification by the receiving vehicle and used to give access to the receiving vehicle for delivery.

In one embodiment, the vehicle may determine location information to share with a remote server of delivery service. Vehicle-to-vehicle (V2V) communications, vehicle-to-infrastructure (V2I) communications, or vehicle-to-anything (V2X, which includes V2V and V2I) communications may be used to dynamically report or co-report a vehicle location. For example, when a vehicle enters a parking garage, vehicles may communicate with each other in order to report and transmit locations that they travel and where they park within a parking structure. Technologies for V2X communication are available through companies such as Cohda Wireless®. In one embodiment, security systems integrated in parking lots or structures could be interfaced to pick up information on vehicles receiving deliveries and also delivery vehicles themselves. Internal GPS systems (known as iPS or iGPS) within structures may be used to locate exact locations of vehicles inside a structure.

In one embodiment, an integrated location tracking system may be based on dedicated short range communication (DSRC) technologies, Bluetooth® low energy (BLE) technologies, or other protocol that may be used for communicating with other systems, determining a location, or the like. DSRC technologies will likely be standard and mandatory in vehicles, thus providing a universal standard protocol for basing the system.

According to one embodiment, a system for delivering packages to an unattended vehicle receives an order for delivery of an item to a vehicle. The system determines identifying information for the vehicle, the identifying information comprising a wireless identifier of the vehicle. The system determines a delivery location of the vehicle. The system transmits a request to dispatch a delivery vehicle to deliver a package to the vehicle, wherein the request comprises the identifying information and the delivery location.

According to one embodiment, a receiving vehicle provides information about a location of the vehicle. The receiving vehicle may receive wireless signal information at the vehicle. The wireless signal information includes information from one or more of infrastructure transceivers or a positioning system. The vehicle records driving maneuvers performed by the vehicle. The driving maneuvers include a steering maneuver and a distance traveled. The vehicle transmits location information to a remote server. The location information includes location information based on the wireless signal information and the driving maneuvers performed by the vehicle.

A delivery vehicle may travel to a location of a receiving vehicle. The delivery vehicle receives delivery instructions. The delivery instructions indicate an approximate location of a target vehicle and dead reckoning instructions for the target vehicle's location. The delivery vehicle drives to the approximate location of the target vehicle. The delivery vehicle drives to the location of the target vehicle based on the dead reckoning instructions.

The receiving vehicle may include a communication system with a modem for receiving and sending communication signals including data sent via the interne. The vehicle includes a remotely controllable compartment for accommodating unattended delivery. The vehicle communicates with a remote entity to control access to the vehicle, a service provider receiving orders for items to be delivered to a vehicle, and a delivery service for finding and delivering items to a vehicle. A delivery service system may receive an order for delivery of an item to a vehicle, where the order may include customer information and vehicle identification and location information. In one embodiment, an order may be placed online by a user including item information, user information, vehicle identification information and vehicle location information. The vehicle location information may also be obtained separately. In one embodiment, the vehicle location information may include a range of time when the vehicle will be located at a particular location and/or periodic updates on vehicle location information until the item is delivered to the vehicle.

The vehicle identification information may include a tire pressure sensor ID that is broadcast from each wheel, an IP address of the modem in the vehicle, a phone number, a photo identification of the vehicle, a license plate number, a vehicle identification number (VIN), etc. The delivery service system may determine a location of the vehicle using an RFID system located proximate the vehicle. For example, the vehicle may pair with an RFID device located near the parking spot where the vehicle is located. The delivery service system dispatches a delivery vehicle with the item to be delivered to the vehicle. In one embodiment, the delivery service system may confirm a location of the vehicle based on a message from the vehicle, information in the order, or the like. In one embodiment, the delivery service system may determine the location of the vehicle within a time range of delivery. For example, the vehicle may move before or after an order is placed.

The location of the vehicle may be determined by a receiving vehicle, a system for delivering packages, and/or a delivery vehicle. The vehicle location may be determined on a direct location, such as a specific geographical location determined based on GPS, wireless network location services, or the like. For example, the vehicle location may be determined within a few feet or meters of a geographic location. The vehicle location may also be determined, at least partially, based on non-geographic location information. For example, non-geographic location information may include dead reckoning information such as a distance traveled, turns performed and/or the like from a known or approximate location. In one embodiment, a system for delivering packages may determine an exact location for a vehicle (e.g., parking location or geographical location) based on the non-geographic or dead reckoning information. For example, the system for delivering packages may use maps of a parking lot, parking garage, or other location to virtually traverse a parking area following dead reckoning instructions provided by the vehicle. In one embodiment, a vehicle may provide an approximate location, such as a last known geographic location, address, or the like and also provide driving maneuvers or other dead reckoning information to allow a delivery vehicle to arrive at the vehicle by retracing a location based on the driving maneuvers. In one embodiment, a vehicle may gather and send this information to a remote system so that a current location of the vehicle may be determined in the case a package or item needs to be delivered.

In one embodiment, the vehicle may gather driving maneuver information (dead reckoning information) only when a connection to a positioning system (e.g., GPS) is lost. In one embodiment, the vehicle may gather and/or store a predefined amount (e.g., 30 minutes) of trailing information even just in case a positioning system connection is lost. In one embodiment, the vehicle may transmit all the dead reckoning information to a server and the server stores a predefined amount. In one embodiment, driving maneuvers and/or dead reckoning information may only gathered and/or uploaded if a user has agreed to have this information tracked for delivery or other purposes.

A receiving vehicle (or potential package receiving vehicle) may communicate with D SRC, BLE, transceivers of other vehicles, infrastructure transceivers, or other devices. This information may allow the vehicle to upload identifiers for corresponding transceivers. Based on the identifiers, and/or a knowledge of where these transceivers are located, a system for delivering packages may be able to determine accurate or approximate locations of a vehicle.

When the location of a vehicle is determined, the delivery vehicle may navigate to the location of the receiving vehicle for delivery. The receiving vehicle may receive a wireless signal from a delivery vehicle or a delivery service system prior to delivery. The receiving vehicle may authenticate the delivery signal, grant access to the vehicle, and/or receive the package or item into a compartment (e.g., trunk, cabin, or other compartment) of the vehicle. Upon delivery, the receiving vehicle and/or the delivery vehicle may provide a signal or message indicating that the delivery is complete.

Pinpointing the location of a specific vehicle in a parking lot can be extremely difficult, for delivery drivers or even for vehicle owners. Especially with the introduction of the vehicle delivery service, finding a vehicle in a timely manner may result in financial advantage because the cost of delivery may be reduced. Taking into account the large size of many shopping malls or parking garages, Applicants have recognized that having an easy, fast, and intuitive way to pinpoint the location of the vehicle that does not require any technical knowledge would be extremely helpful. In short, not only is it important to have a technology that helps guide users to a vehicle, but also to have it displayed in a suitable medium for a delivery driver or delivery system.

In one embodiment, a heads up display or other display may be used to overlay a marker on the receiving vehicle. The display may include a display in a vehicle, such as an in-dash display or windshield display, or other display, such as a headset display. In one embodiment, a smart phone display may be used. A receiving vehicle may be able to communicate directly, or through V2X communication such as DSRC, with a smart phone or other device. The display may then overlay a 'marker' where the vehicle is located, using augmented reality. Once the phone or other device senses where the vehicle is, it will create an on-lay to the street view ahead to show the fastest and best way to arrive to the owner's vehicle. For example, green arrows may show paths that should be taken to arrive at the vehicle while red X's or other types of markers will show where not to go. The display may also show a distance of the vehicle from a current location of the delivery vehicle as well as an estimated time till arrival at vehicle. In parking garages, augmented reality can provide guidance as to how to get to the proper level for the receiving vehicle.

The embodiments disclosed herein can provide significant and valuable options for delivery to an unattended vehicle. This can provide extreme convenience of delivery to a vehicle without the need to establish the location of the vehicle ahead of time or even allowing the vehicle to change locations after an order is placed or is out for delivery.

Further embodiments and examples will be discussed in relation to the figures below.

FIG. 1 is a schematic block diagram illustrating a system 100 for delivering an item or a package to an unattended vehicle. The system 100 includes a delivery service system 102, a receiving vehicle 104, and a delivery vehicle 106. Different components or systems of the system 100 for delivering to an unattended vehicle may communicate over a network 110. The network 110 may include one or more networks such as a local area network (LAN), wide area network (WAN), a cellular network, the Internet, or the like.

The delivery service system 102 may receive an order for an item from an ordering system 112. The ordering system 112 may include any type of merchant, such as an online merchant with whom a consumer has placed an order. The order may include order information such as an item to be delivered, customer information for a customer for whom the order has been placed, and/or vehicle information about a vehicle to which the order is to be delivered. The customer information may include a customer name, customer account identifier, customer contact information, or the like.

The vehicle information may include a VIN for a receiving vehicle 104 or any other information about the receiving vehicle 104. The vehicle information may include a visual description such as a color, vehicle make, vehicle model, vehicle style, or the like. The vehicle information may include a license plate identifier or an image of a license plate. The vehicle information may include a wireless identifier corresponding to the receiving vehicle 104, such as an IP address, a telephone number, a tire pressure transmitter identifier, RFID tag information, a media access control (MAC) address of a radio, or other information corresponding to a communication system of the receiving vehicle 104.

The vehicle information may also include information about a location of the receiving vehicle 104. For example, the location may indicate an address, GPS position, or other location of the vehicle for where the receiving vehicle 104 will be to receive the item or package. In one embodiment, the vehicle information may include an authorization code for communicating with the receiving vehicle 104 in order to determine its location. The location information may include a positioning system location and/or may include an approximate location plus dead reckoning information for the location of the receiving vehicle 104. The location information may include an identifier of a parking space, parking level of a parking garage, or the like. In one embodiment, the vehicle information may include identifiers for one or more infrastructure transceivers, nearby vehicles, or the transceiver so that the location of the vehicle may be determined based on a known location of the infrastructure transceiver, nearby vehicle, or the transceiver.

In one embodiment, the delivery service system 102 may not receive at least some location information within the order, but may determine the location in response to receiving the order. For example, the delivery service system 102 may retrieve data corresponding to a location of the receiving vehicle 104 or communicate directly with the receiving vehicle 104 to determine its location. The delivery service system 102 may request and receive any of the vehicle location information discussed herein.

The delivery service system 102 may dispatch a delivery driver 116 or delivery vehicle 106 to deliver the item or package to the receiving vehicle 104. The delivery service system 102 may provide any vehicle information or vehicle location information to the delivery driver 116 and/or delivery vehicle 106. The delivery service system 102 may provide information to the delivery driver 116 and/or delivery vehicle 106 by sending order or vehicle information to a delivery device 120. The delivery device 120 may include a mobile computing device such as a smart phone, tablet, in-dash computer of the delivery vehicle 106, or any other computing device. In one embodiment, a delivery vehicle 106 may be controlled or driven by a human driver 116 or may be driven by an automated driving system. The delivery vehicle 106 may include a land vehicle, aerial vehicle (such as an aerial drone), or any other type of small or large transportation vehicle.

The receiving vehicle 104 may include a vehicle capable of being driven by a human and/or a vehicle capable of autonomous driving. The receiving vehicle 104 may include a vehicle owned, rented, or to be used by a consumer who ordered an item. The receiving vehicle 104 may determine or gather information regarding its location. The receiving vehicle 104 may gather positioning system data, such as signals from a satellite, nodes of a wireless network, or the like. The receiving vehicle may 104 determine its location or store the gathered location information for later transmission to the delivery service system 102. The receiving vehicle 104 may gather dead reckoning data. The dead reckoning data may include a series of maneuvers and/or distances driven by the receiving vehicle 104. For example, the dead reckoning data may include a list of distances and turns performed by the receiving vehicle such that dead reckoning data may be followed or used to determine the location of the receiving vehicle 104 from a previous known location of the receiving vehicle 104. In one embodiment, the dead reckoning data may be used in combination with road map data, parking lot map data, parking garage map data, or any other information to virtually follow the dead reckoning data to the actual location of a vehicle.

In one embodiment, the receiving vehicle 104 gathers location information based on infrastructure transceivers. For example, transceivers at a traffic signal 114, traffic intersection, traffic monitor (such as traffic speed sensors or traffic cameras), or other location may transmit a wireless signal that includes an identifier for the infrastructure transceiver. The receiving vehicle 104 may obtain these identifiers, along with a current time or time stamp for when the signal was received. Because the location of infrastructure transceivers may be fixed and/or determined, the delivery service system 102, or other entity, may determine a rough or approximate location of the receiving vehicle 104. Additional infrastructure data may include RFID tags in parking lots, parking spots, intersections, or the like. Based on the RFID tag with which the receiving vehicle 104 pairs, a specific location of the receiving vehicle 104 may be determined.

The receiving vehicle 104 may send its current location and/or any other location data to the delivery service system 102 or storage location accessible by the delivery service system 102. For example, GPS location, address information, infrastructure data, RFID data, dead reckoning information, and/or any other vehicle location information may be uploaded. The receiving vehicle 104 may send the vehicle location information via the network 110, a wireless access node 108 (such as a node of a cellular network), or the like. In one embodiment, if the receiving vehicle 104 is out of range of a cellular network, the receiving vehicle 104 may upload the information via a Wi-Fi network, ad hoc wireless network, or the like. An ad hoc wireless network may be created and/or include a wireless nodes of other vehicles 118. For example, nearby vehicles 118 may create an ad-hoc network through one or more vehicles until a vehicle or node is found that can send data via the network 110. For example, the receiving vehicle 104 may transmit information through one or more intervening nodes before connecting to a cellular node 108 that is connected to the network 110.

After an order has been placed, the receiving vehicle 104 may remain stationary or may move to a new location. If the vehicle moves, the receiving vehicle 104 may transmit updated location information so that the new location of the vehicle can be determined.

When a delivery vehicle 106 arrives at or near a location of the receiving vehicle 104, the receiving vehicle 104 may transmit information to communicate with the delivery vehicle 106. For example, the receiving vehicle 104 may transmit wireless messages for receipt by the delivery vehicle 106. The wireless messages may include internet protocol (IP) messages, RFID messages, DSRC messages, BLE messages, or other messages to confirm that the receiving vehicle 104 is the target vehicle for a delivery. In one embodiment, wheel tire pressure sensors may transmit information which can be received by the delivery vehicle 106 (or delivery device 120) to confirm that the receiving vehicle 104 is the delivery target or that the delivery vehicle has arrived at a location of the receiving vehicle 104.

In one embodiment, the receiving vehicle 104 may communicate with the delivery vehicle 106, delivery service system 102, and/or other device or system to determine that the delivery vehicle 106 or delivery device 120 is authorized to deliver an item to the receiving vehicle. Upon authorization, the receiving vehicle 104 may open a compartment for receiving the item or package. For example, the receiving vehicle 104 may open a trunk or other compartment to allow the item or package to be placed safely in the vehicle. The receiving vehicle 104 may close the compartment and send a message to the delivery service system 102, or other location, confirming a successful delivery.

The delivery vehicle 106 may navigate to a location of the receiving vehicle 104 upon being dispatched by the delivery service system 102. The delivery vehicle 106 may navigate to a GPS location, address, and/or follow dead reckoning information to arrive at the location of the delivery vehicle. In one embodiment, the delivery vehicle 106 or delivery device 120 may provide instructions to a human or automated driver for arriving at the location of the receiving vehicle 104. In one embodiment, the delivery vehicle 106 or delivery device 120 may provide augmented reality instructions where arrows, markers, or other visual indications of a vehicles location, or maneuvers to follow to arrive at a vehicles location are displayed. The instructions or indications may be displayed using an in-dash display, heads-up windshield display, headset display, or the like.

Figure 2:
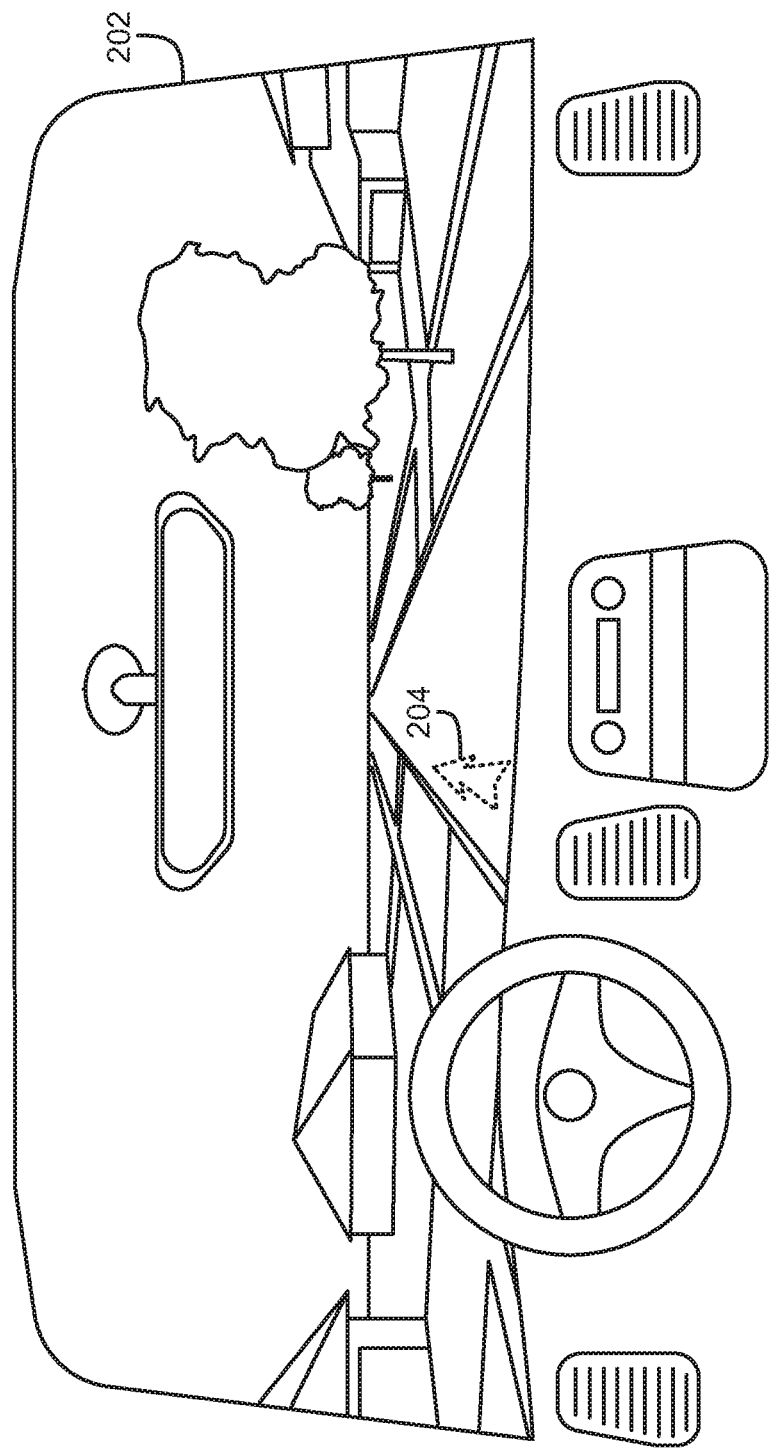
FIG. 2 illustrates a cabin view with augmented reality driving instructions, according to one embodiment.

FIG. 2 is illustrates a cabin view through a windshield 202 in a delivery vehicle 106, according to one embodiment. An arrow 204 is shown on the windshield 202 to provide a heads up display for a driver on how to arrive at a location of the receiving vehicle 104. For example, arrows may be used to show a direction to drive or turn. As another example, a flag at a location of a vehicle may be displayed so that a driver knows where the vehicle is. As yet another example, an "X" or other symbol may be shown in drive ways, lanes, or outlets where the delivery vehicle 106 is not to drive. The on-screen or augmented reality directions may be helpful to a human driver maneuvering on unknown roads or within parking lots or garages where location of a vehicle may be difficult or confusing.

Figure 3:
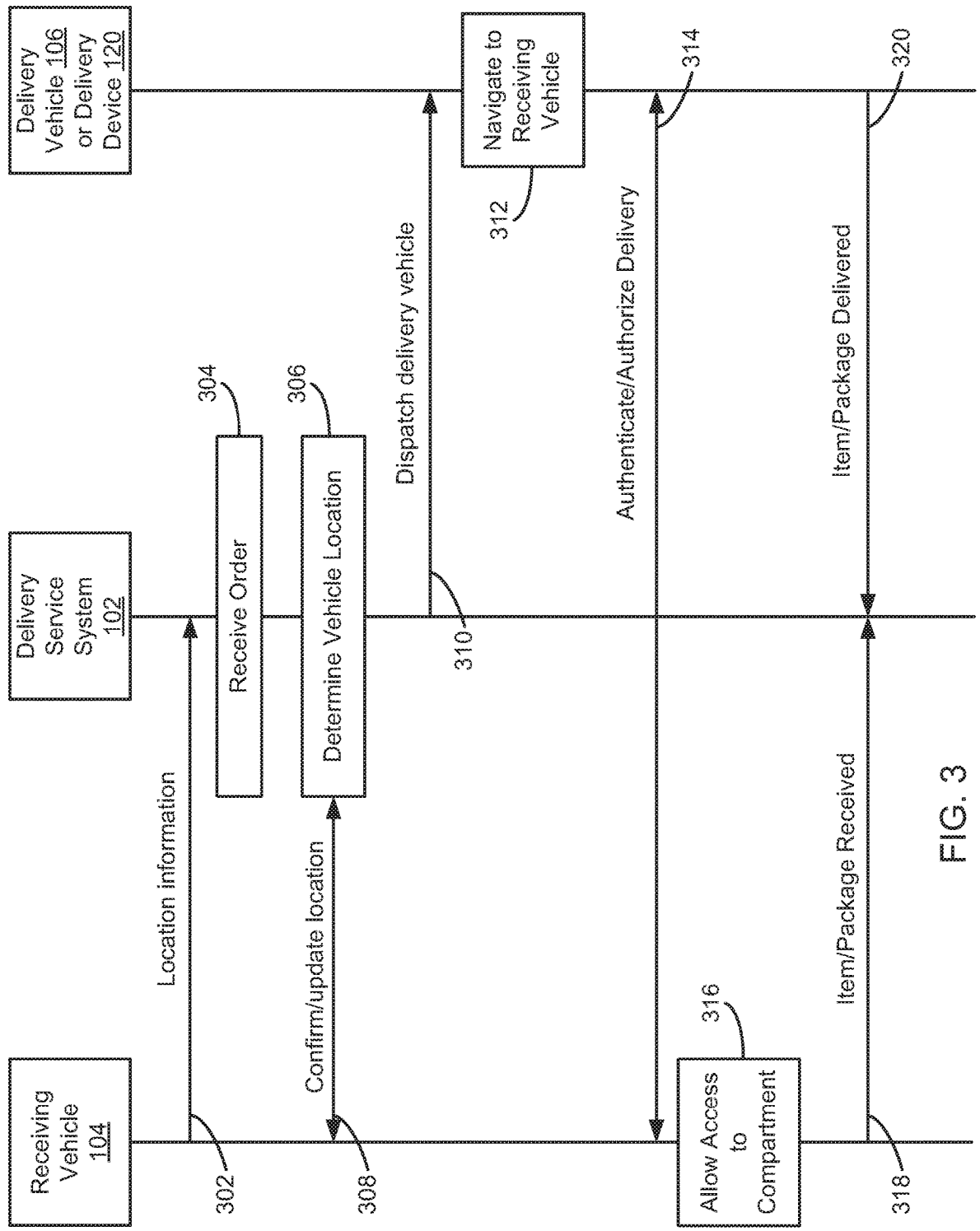
FIG. 3 is a schematic call flow diagram illustrating a method for delivering an item to an unattended vehicle, according to one embodiment.

FIG. 3 is a schematic diagram illustrating communication between a receiving vehicle 104, delivery service system 102, and a delivery vehicle 106 or delivery device 120 to deliver an item or package. At 302, the receiving vehicle 104 uploads location information for the receiving vehicle 104. At 304, the delivery service system 102 receives an order and determines a vehicle location at 306. The delivery service system 102 may communicate with the receiving vehicle 104 to confirm or update a location of the receiving vehicle 104 at 308.

At 310, the delivery service system 102 dispatches a delivery vehicle by sending a message to the delivery vehicle 106 or a delivery device 120. The delivery vehicle 106 navigates to a location of the receiving vehicle at 312. Upon arriving at a location of the receiving vehicle 104, the delivery vehicle 106 or delivery device 120 authenticates and authorizes delivery to the receiving vehicle 104 at 314. In response to authenticating/authorizing delivery with the delivery vehicle 106 or delivery device 120, the receiving vehicle 104 allows access to a delivery compartment (such as a trunk), at 316. Upon delivery, the receiving vehicle 104 confirms receipt of the item or package at 318 and the delivery vehicle 106 or delivery device 120 confirms delivery at 320.

Figure 4:
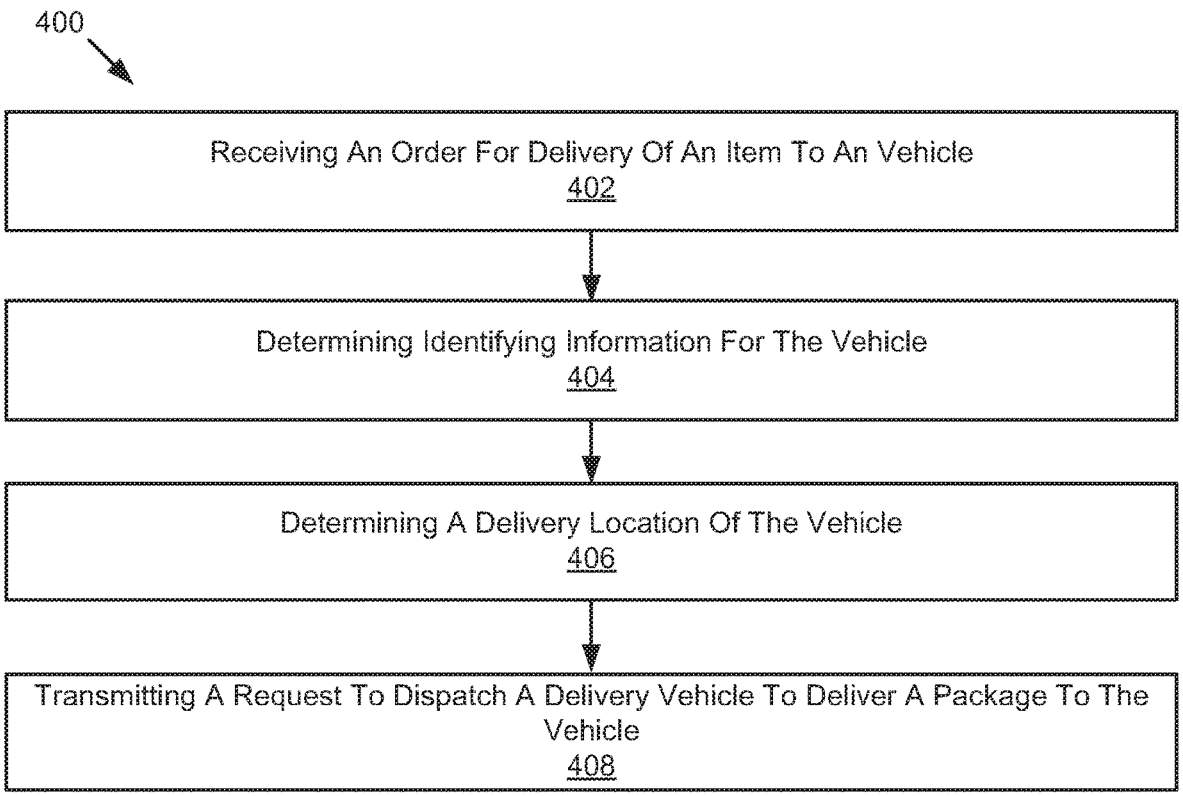
FIG. 4 is a schematic flow chart diagram illustrating a method for delivering packages to an unattended vehicle, according to one embodiment.

FIG. 4 is a schematic flow chart diagram illustrating a method 400 for delivery packages to an unattended vehicle. The method 400 may be performed by a delivery service system, such as the delivery service system 102 of FIG. 1 or 3.

The method 400 begins and the delivery service system 102 receives at 402 an order for delivery of an item to a vehicle. The delivery service system 102 determines at 404 identifying information for the vehicle. The identifying information may include a wireless identifier of the vehicle. The delivery service system 102 determines at 406 a delivery location of the vehicle. The delivery service system 102 transmits at 408 a request to dispatch a delivery vehicle to deliver a package to the vehicle. The request may include the identifying information and the delivery location.

Figure 5:
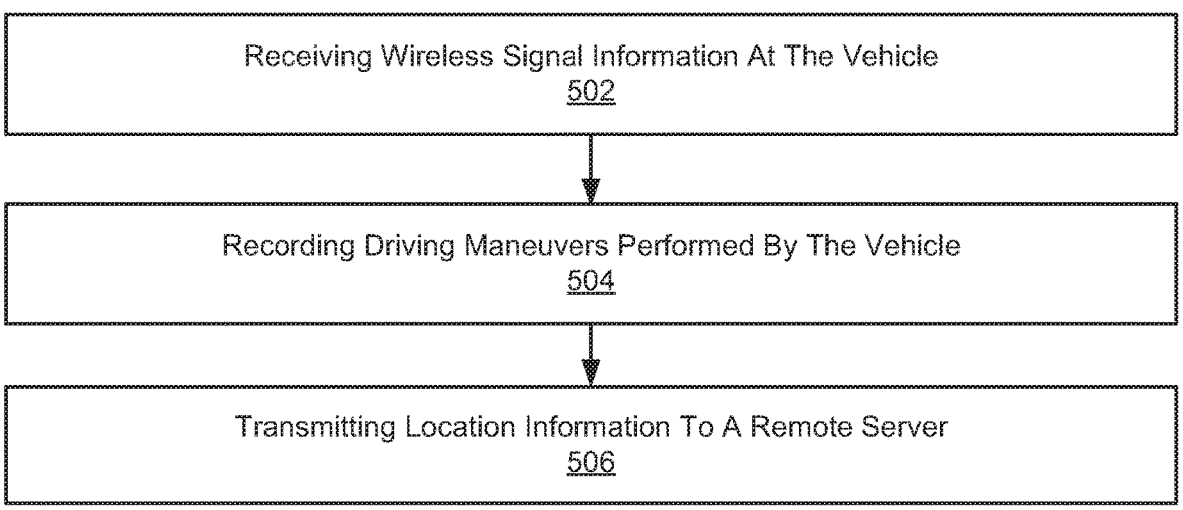
FIG. 5 is a schematic flow chart diagram illustrating a method for providing information about a location of a vehicle, according to one embodiment.

FIG. 5 is a schematic flow chart diagram illustrating a method 500 for providing information about a location of a vehicle. The method 500 may be performed by a receiving vehicle, such as the receiving vehicle 104 of FIG. 1 or 3.

The method 500 begins and the receiving vehicle 104 receives at 502 wireless signal information at the vehicle. The wireless signal information may include information from one or more of infrastructure transceivers or a positioning system. The receiving vehicle 104 records at 504 driving maneuvers performed by the vehicle. For example, the driving maneuvers may include a steering maneuver and/or a distance traveled. The receiving vehicle 104 transmits at 506 location information to a remote server. For example, the location information may include location information based on the wireless signal information and the driving maneuvers performed by the vehicle.

Figure 6:
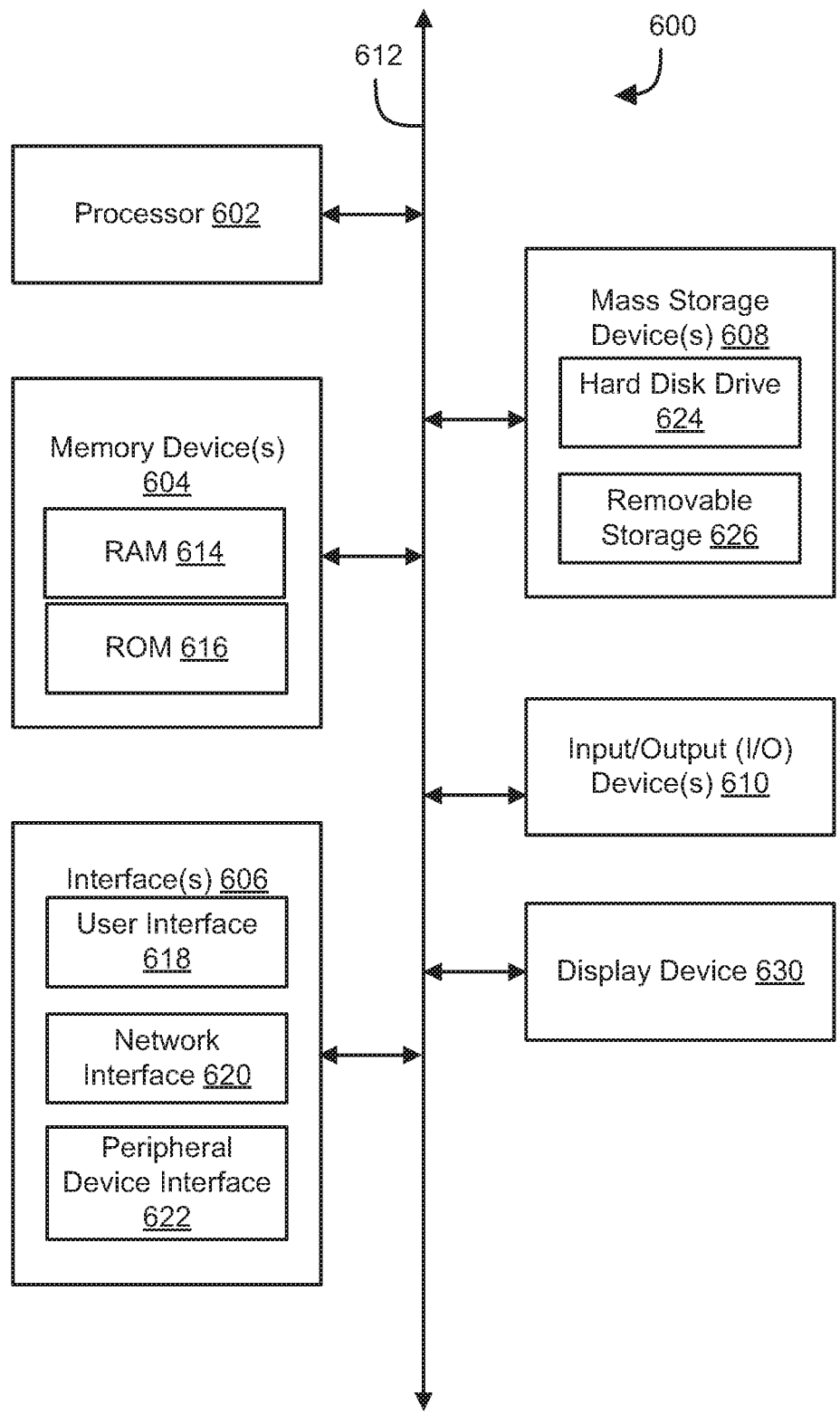
FIG. 6 is a schematic block diagram illustrating a computing system, according to one implementation.

Referring now to FIG. 6, a block diagram of an example computing device 600 is illustrated. Computing device 600 may be used to perform various procedures, such as those discussed herein. A computing device 600 may perform any of the functions or methods of the delivery service system 102, receiving vehicle 104, delivery vehicle 106, delivery device 120, and/or any other computing entity. Computing device 600 can perform various delivery functions as discussed herein, and can execute one or more application programs, such as the application programs or functionality described herein. Computing device 600 can be any of a wide variety of computing devices, such as a desktop computer, in-dash computer, vehicle control system, a notebook computer, a server computer, a handheld computer, tablet computer and the like.

Computing device 600 includes one or more processor(s) 602, one or more memory device(s) 604, one or more interface(s) 606, one or more mass storage device(s) 608, one or more Input/Output (I/O) device(s) 610, and a display device 630 all of which are coupled to a bus 612. Processor(s) 602 include one or more processors or controllers that execute instructions stored in memory device(s) 604 and/or mass storage device(s) 608. Processor(s) 602 may also include various types of computer-readable media, such as cache memory.

Memory device(s) 604 include various computer-readable media, such as volatile memory (e.g., random access memory (RAM) 614) and/or nonvolatile memory (e.g., read-only memory (ROM) 616). Memory device(s) 604 may also include rewritable ROM, such as Flash memory.

Mass storage device(s) 608 include various computer readable media, such as magnetic tapes, magnetic disks, optical disks, solid-state memory (e.g., Flash memory), and so forth. As shown in FIG. 6, a particular mass storage device is a hard disk drive 624. Various drives may also be included in mass storage device(s) 608 to enable reading from and/or writing to the various computer readable media. Mass storage device(s) 608 include removable media 626 and/or non-removable media.

I/O device(s) 610 include various devices that allow data and/or other information to be input to or retrieved from computing device 600. Example I/O device(s) 610 include cursor control devices, keyboards, keypads, microphones, monitors or other display devices, speakers, printers, network interface cards, modems, and the like.

Display device 630 includes any type of device capable of displaying information to one or more users of computing device 600. Examples of display device 630 include a monitor, display terminal, video projection device, and the like.

Interface(s) 606 include various interfaces that allow computing device 600 to interact with other systems, devices, or computing environments. Example interface(s) 606 may include any number of different network interfaces 620, such as interfaces to local area networks (LANs), wide area networks (WANs), wireless networks, and the Internet. Other interface(s) include user interface 618 and peripheral device interface 622. The interface(s) 606 may also include one or more user interface elements 618. The interface(s) 606 may also include one or more peripheral interfaces such as interfaces for printers, pointing devices (mice, track pad, or any suitable user interface now known to those of ordinary skill in the field, or later discovered), keyboards, and the like.

Bus 612 allows processor(s) 602, memory device(s) 604, interface(s) 606, mass storage device(s) 608, and I/O device(s) 610 to communicate with one another, as well as other devices or components coupled to bus 612. Bus 612 represents one or more of several types of bus structures, such as a system bus, PCI bus, IEEE bus, USB bus, and so forth.

For purposes of illustration, programs and other executable program components are shown herein as discrete blocks, although it is understood that such programs and components may reside at various times in different storage components of computing device 600, and are executed by processor(s) 602. Alternatively, the systems and procedures described herein can be implemented in hardware, or a combination of hardware, software, and/or firmware. For example, one or more application specific integrated circuits (ASICs) can be programmed to carry out one or more of the systems and procedures described herein.

EXAMPLES

The following examples pertain to further embodiments.

Example 1 is a system for delivering packages to an unattended vehicle. The system receives an order for delivery of an item to a vehicle. The system determines identifying information for the vehicle, the identifying information including a wireless identifier of the vehicle. The system determines a delivery location of the vehicle. The system transmits a request to dispatch a delivery vehicle to deliver a package to the vehicle, wherein the request includes the identifying information and the delivery location.

In Example 2, the wireless identifier as in Example 1 includes an identifier transmitted by the vehicle during wireless communication.

In Example 3, determining the delivery location as in any of Examples 1-2 includes determining the location based on one or more of the following received from the vehicle: a last known location determined using a positioning system; dead reckoning driving information including driving maneuvers performed by the vehicle; or identifiers of one or more infrastructure transceivers received by the vehicle.

In Example 4, the request to dispatch as in any of Examples 1-3 includes authentication information to authenticate delivery permission with the vehicle.

Example 5 is a method for providing information about a location of a vehicle that includes receiving wireless signal information at the vehicle, wherein the wireless signal information include information from one or more of infrastructure transceivers or a positioning system. The method includes recording driving maneuvers performed by the vehicle, the driving maneuvers including a steering maneuver and a distance traveled. The method includes transmitting location information to a remote server, wherein the location information includes location information based on the wireless signal information and the driving maneuvers performed by the vehicle.

In Example 6, receiving wireless signal information as in Example 5 includes receiving one or more of: a parking lot identifier or a parking space identifier from an radio frequency identifier (RFID) transmitter; positioning information received from a wireless communication network; positioning information received in satellite signals of a positioning system; and/or signals transmitted by traffic signal transmitters.

In Example 7, transmitting the location information as in any of Examples 5-6 includes transmitting via one or more of: a wireless cellular communication network; V2V communication; and/or V2I communication.

In Example 8, a method as in any of Examples 5-7 includes receiving a request to locate the vehicle, wherein transmitting the location information includes transmitting in response to the request to locate the vehicle.

In Example 9, a method as in any of Examples 5-8 further includes: receiving a wireless signal from a delivery vehicle or device; allowing delivery of the item to a compartment of the vehicle in response to authentication of the delivery vehicle or device; and/or transmitting a delivery confirmation signal confirming delivery of the item.

In Example 10, transmitting the location information as in any of Examples 6-9 includes transmitting using a transceiver of the vehicle, and wherein allowing delivery of the item includes opening a delivery compartment.

In Example 11, a method as in any of Example 5 further includes determining that a delivery vehicle is within a threshold distance and providing a notification of the vehicles' presence by one or more of: flashing one or more lights of the vehicle; or transmitting a wireless signal to the delivery vehicle.

In Example 12, transmitting the wireless signal as in Example 11 includes transmitting a wireless signal using wheel sensors of the vehicle.

In Example 13, a method as in any of Examples 5-12 further includes determining that a connection with a positioning system is degrading or has been lost. Recording the driving maneuvers or transmitting the location information including driving maneuvers includes recording or transmitting in response to determining that the connection to the positioning system is degrading or has been lost.

Example 14 is computer readable storage media storing instructions that, when executed by one or more processors, cause the one or more processors to receive delivery instructions, wherein the delivery instructions indicate an approximate location of a target vehicle and dead reckoning instructions for the target vehicles location. The instructions cause the one or more processors to drive to the approximate location of the target vehicle. The instructions cause the one or more processors to drive to the location of the target vehicle based on the dead reckoning instructions.

In Example 15, the instructions of Example 14 further cause the one or more processors to identify the target vehicle based on one or more of: a license plate of the target vehicle; a visual description of the vehicle; and/or a wireless signal transmitted by the target vehicle.

In Example 16, the approximate location as in any of Examples 14-15 includes an address or positioning system location for a parking lot or garage where the vehicle is located.

In Example 17, the approximate location as in any of Examples 14-16 includes a last known location of the target vehicle before the target vehicle lost a positioning system signal.

In Example 18, the dead reckoning instructions as in any of Example 18 include vehicle maneuvers performed by the target vehicle after the target vehicle arrived at or near the approximate location.

In Example 19, the instructions as in any of Examples 14-18 cause the one or more processors to display directions to the target vehicle on a display.

In Example 20, the display as of Example 19 includes one or more of a heads-up display or a headset display.

Example 21 is a system or device that includes means for implementing a method, system, or device as in any of Examples 1-20.

In the above disclosure, reference has been made to the accompanying drawings, which form a part hereof, and in which is shown by way of illustration specific implementations in which the disclosure may be practiced. It is understood that other implementations may be utilized and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Implementations of the systems, devices, and methods disclosed herein may comprise or utilize a special purpose or general-purpose computer including computer hardware, such as, for example, one or more processors and system memory, as discussed herein. Implementations within the scope of the present disclosure may also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, implementations of the disclosure can comprise at least two distinctly different kinds of computer-readable media: computer storage media (devices) and transmission media.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium, which can be used to store desired program code means in the form of computer-executable instructions or data structures and which can be accessed by a general purpose or special purpose computer.

An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links, which can be used to carry desired program code means in the form of computer-executable instructions or data structures and which can be accessed by a general purpose or special purpose computer. Combinations of the above should also be included within the scope of computer-readable media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, an in-dash vehicle computer, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Further, where appropriate, functions described herein can be performed in one or more of: hardware, software, firmware, digital components, or analog components. For example, one or more application specific integrated circuits (ASICs) can be programmed to carry out one or more of the systems and procedures described herein. Certain terms are used throughout the description and claims to refer to particular system components. The terms "modules" and "components" are used in the names of certain components to reflect their implementation independence in software, hardware, circuitry, sensors, or the like. As one skilled in the art will appreciate, components may be referred to by different names. This document does not intend to distinguish between components that differ in name, but not function.

It should be noted that the sensor embodiments discussed above may comprise computer hardware, software, firmware, or any combination thereof to perform at least a portion of their functions. For example, a sensor may include computer code configured to be executed in one or more processors, and may include hardware logic/electrical circuitry controlled by the computer code. These example devices are provided herein purposes of illustration, and are not intended to be limiting. Embodiments of the present disclosure may be implemented in further types of devices, as would be known to persons skilled in the relevant art(s).

At least some embodiments of the disclosure have been directed to computer program products comprising such logic (e.g., in the form of software) stored on any computer useable medium. Such software, when executed in one or more data processing devices, causes a device to operate as described herein.

While various embodiments of the present disclosure have been described above, it should be understood that they have been presented by way of example only, and not limitation. It will be apparent to persons skilled in the relevant art that various changes in form and detail can be made therein without departing from the spirit and scope of the disclosure. Thus, the breadth and scope of the present disclosure should not be limited by any of the above-described exemplary embodiments, but should be defined only in accordance with the following claims and their equivalents. The foregoing description has been presented for the purposes of illustration and description. It is not intended to be exhaustive or to limit the disclosure to the precise form disclosed. Many modifications and variations are possible in light of the above teaching. Further, it should be noted that any or all of the aforementioned alternate implementations may be used in any combination desired to form additional hybrid implementations of the disclosure.

Further, although specific implementations of the disclosure have been described and illustrated, the disclosure is not to be limited to the specific forms or arrangements of parts so described and illustrated. The scope of the disclosure is to be defined by the claims appended hereto, any future claims submitted here and in different applications, and their equivalents.

What is claimed is:

1. A system for delivering packages to an unattended and locked vehicle, the system configured to:
   receive an order for delivery of an item to the unattended and locked vehicle;
   determine identifying information for the unattended and locked vehicle, the identifying information comprising a wireless identifier of the unattended and locked vehicle and location information based on a signal received from an infrastructure transceiver that includes an identifier for the infrastructure transceiver and a time stamp for when the signal was received;

determine, based on the location information, a delivery location of the unattended and locked vehicle;

transmit a request to dispatch a delivery vehicle to deliver a package to the unattended and locked vehicle, wherein the request comprises the identifying information and the delivery location;

transmit, by the unattended and locked vehicle, at least a portion of the location information directly or through vehicle to anything communication to one or more display devices comprising at least one of an in-dash display of the delivery vehicle and a windshield display of the delivery vehicle; and generate, by the one or more display devices and responsive to the unattended and locked vehicle transmitting at least the portion of the location information to the one or more display devices, a heads up display comprising a directional on-lay and an augmented reality overlay, wherein the directional on-lay provides directions based on the identifying information and the delivery location, and wherein the augmented reality overlay indicates the delivery location.

2. The system of claim 1, wherein the wireless identifier comprises an identifier transmitted by the unattended and locked vehicle during wireless communication, wherein the one or more display devices comprises the in-dash display of the delivery vehicle, and wherein transmit, by the unattended and locked vehicle, at least the portion of the location information is directly to the one or more display devices.

3. The system of claim 1, wherein determining the delivery location is further based on one or more of the following received from the unattended and locked vehicle:
- a last known location determined using a positioning system; or
- dead reckoning driving information comprising driving maneuvers performed by the unattended and locked vehicle, wherein the one or more display devices comprises the windshield display of the delivery vehicle, and wherein transmit, by the unattended and locked vehicle, at least the portion of the location information is through vehicle to anything communication to the one or more display devices.

4. The system of claim 1, wherein the request to dispatch the delivery vehicle comprises authentication information to authenticate delivery permission with the unattended and locked vehicle, wherein the one or more display devices comprises each of the in-dash display of the delivery vehicle and the windshield display of the delivery vehicle, and wherein transmit, by the unattended and locked vehicle, at least the portion of the location information is through vehicle to anything communication to the one or more display devices.

* * * * *